March 28, 1944.  K. T. KELLER  2,345,343
SPROCKET GEAR AND METHOD OF MAKING THE SAME
Filed Jan. 29, 1942  2 Sheets-Sheet 1

INVENTOR
KAUFMAN T. KELLER
BY
*Harness, Dind, Pates & Harris.*
ATTORNEYS

March 28, 1944. K. T. KELLER 2,345,343
SPROCKET GEAR AND METHOD OF MAKING THE SAME
Filed Jan. 29, 1942 2 Sheets-Sheet 2
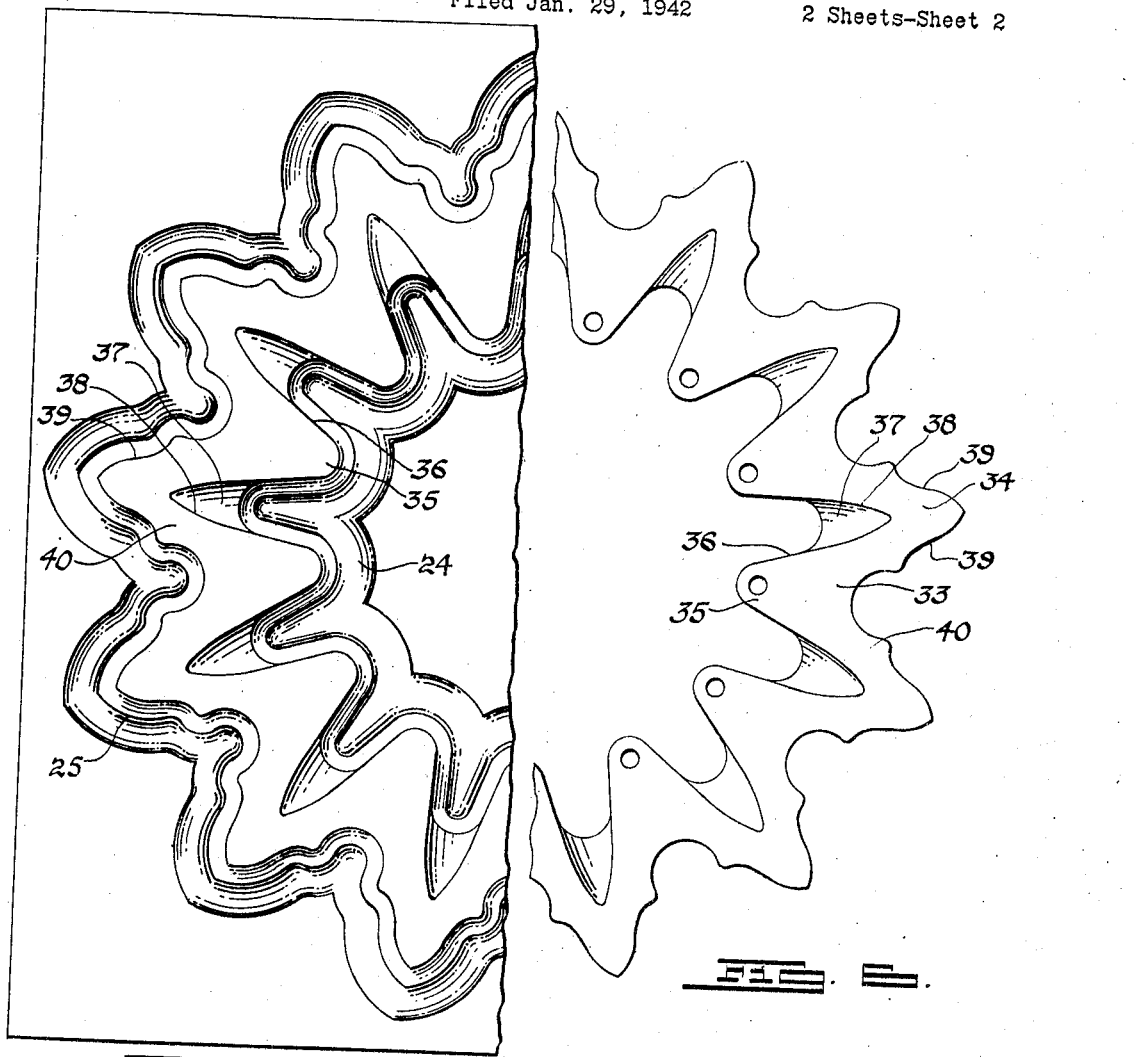
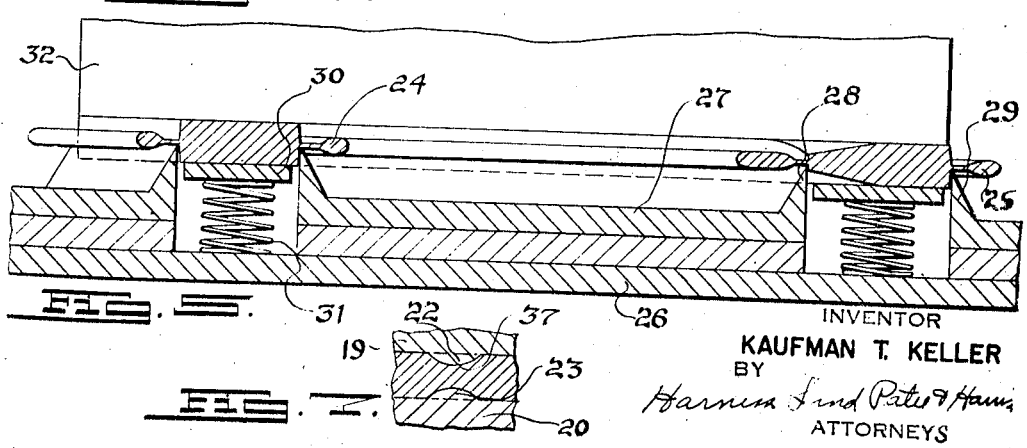
INVENTOR
KAUFMAN T. KELLER
BY
ATTORNEYS Patented Mar. 28, 1944

2,345,343

UNITED STATES PATENT OFFICE 2,345,343

SPROCKET GEAR AND METHOD OF MAKING THE SAME

Kaufman T. Keller, Detroit, Mich., assignor to Chrysler Corporation, Highland Park, Mich., a a corporation of Delaware Application January 29, 1942, Serial No. 428,740

7 Claims. (Cl. 29—159.2)

This invention relates to an improved sprocket wheel and to the method of making the same.

More particularly, the invention pertains to improvements in sprocket wheels of the type used for propelling the caterpillar treads of military tanks.

One of the main objects of the invention is the provision of hammered sprockets of this kind which, by virtue of the working of the metal thereof during hammering, have grain structure, flow line distribution and other metallurgical properties particularly adapted to withstand the severe shock, strain, load and wear to which tank sprockets of this kind are subjected.

A further object of the invention is to provide by a hammering operation a sprocket wheel of this character which has a hollow central portion bounded by an annularly extending serpentine strip of metal from the outer and inner edges of which extend alternate sprocket and mounting teeth respectively.

Still further objects of the invention are to provide in the opposite side faces of the sprocket wheel during the hammering operation, registering indentations or depressions of generally fragmentary conical shape, each of which have base portions constituting regular continuations of the serrations between a pair of inwardly extending mounting teeth and an apex end portion located in the central part of the sprocket tooth which registers radially with the serration; to so operate upon the metal of sprocket teeth during the formation of depressions of this kind as to displace metal sideways from the base and central portions of each tooth toward the converging edges thereof in order to bring a substantial portion of the flow lines of the metal adjacent the edges of each tooth into generally parallel or longitudinal conformity with respect to the edges of the tooth; to provide depressions of this character in the opposite side faces of a sprocket wheel which reduce the weight and metal content of the latter while improving its structural properties and for reducing the area of metal surface of the side faces which requires machining.

An illustrative embodiment of the invention is shown in the accompanying drawings, in which:

Fig. 4 is a fragmentary plan view showing the sprocket wheel before removal from one part of the die as it appears after the final forming operation illustrated in Fig. 3 and before the flash produced during the final hammering step has been cut off.

Fig. 5 is a vertical sectional view of apparatus for cutting the flash produced during the final hammering operation.

Fig. 6 is a fragmentary plan view similar to Fig. 4 but showing the finished wheel after the flash has been removed therefrom.

Fig. 7 is a fragmentary vertical sectional view taken on the line 7—7 of Fig. 3 and illustrating the manner in which the side faces of the sprocket wheel are indented under compression during the final hammering operation.

Figure 1:
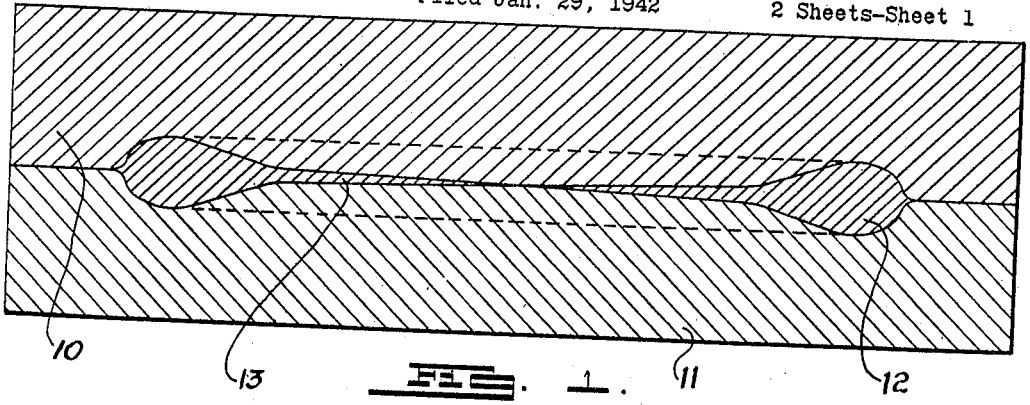
Fig. 1 is a vertical sectional view of a pair of hammered dies employed in the initial hammering operation and showing the first stages of deformation of a metal billet thereby.

In Fig. 1 of the drawings is illustrated the first step in the formation of a toothed wheel such as a sprocket wheel in accordance with the invention by deforming a heated steel billet (not shown) between dies 10 and 11 until the billet has been forged into the shape of an annulus having a thickened peripheral portion 12 and a thin flash or central web portion 13. This operation may be conducted on any suitable hammering machine such as that used in forging heated metal by subjecting it to successive impacts while disposed between suitably shaped dies. The thin central portion of the resulting blank generally designated by the numeral 15 is cut away by apparatus illustrated in Fig. 2 or by any other suitable cutting or punching device.

Figure 2:
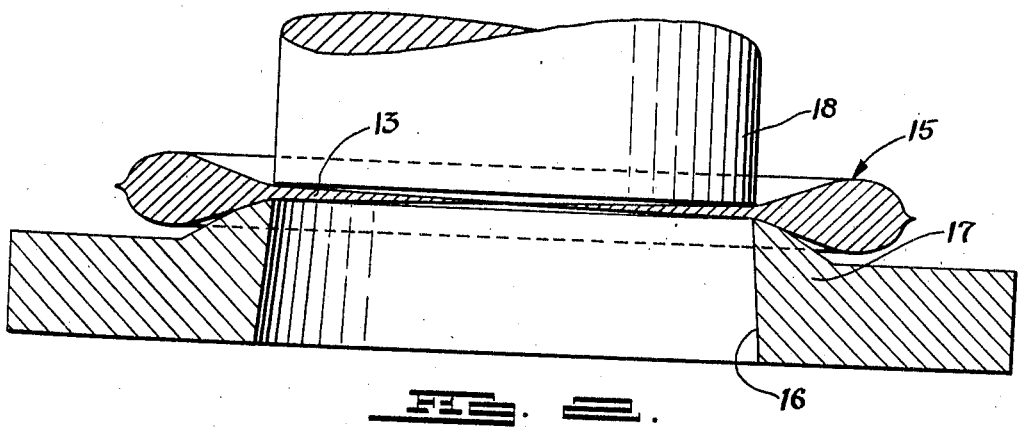
Fig. 2 is a fragmentary sectional view of a pump for removing the central flash formed during the initial hammering operation illustrated in Fig. 1.
Figure 3:
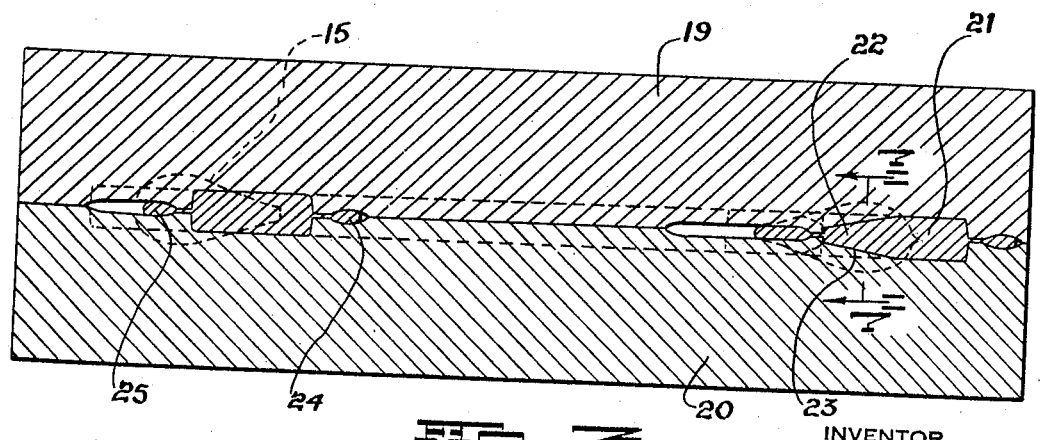
Fig. 3 is a vertical sectional view of finishing hammered dies by which the blank formed by the steps illustrated in Figs. 1 and 2 is brought to finished shape and illustrating the formation of the depressions in the opposite side faces of the sprocket wheel.

In the illustration shown in Fig. 2, the central portion of the blank 15 is disposed over an opening 16 in a cutting die 17 and a punch member 18 is applied to the upper side of the central portion of the blank 15 for the purpose of punching the latter through the opening 16 of the cutting die. The blank 15 thus formed is then subjected to a final forging or hammering operation while heated by which it is brought substantially to its final desired shape. During this operation, as illustrated in Fig. 3, the blank 15 is disposed as illustrated in dotted lines in Fig. 3 between the dies 19 and 20 which are placed in a forging or hammering machine and rounded together until the billet 15 is shaped to the desired contour illustrated in full lines at 21. The dies 19 and 20 are provided with registering depression or indentation forming projections 22 and 23 which are so shaped and located as to form in the finished product fragmentary conical depressions, each of which extends radially of the wheel into the base and adjacent central portions of one of the teeth thereof.

When the wheel is removed from the dies 13, it has inwardly and outwardly projecting fins of flash metal 24 and 25 respectively which are removed by a flash cutting apparatus illustrated in Fig. 5. This flash cutting apparatus comprises a base portion 26 in which is mounted a central cutting die 27 having a cutting edge 28 so shaped as to remove the inner flash 24. A cutting die 29 for removing the outer flash 25 is mounted on the base 26 in surrounding relation with respect to the inner flash cutting die 27. A yieldable ring or platform 30 is disposed between the cutting dies 27 and 29 and supported upon the base 26 by a plurality of coil springs 31. During the flash cutting operation the wheel obtained by operation of the dies shown in Fig. 3 is placed upon the platform 30, as illustrated in Fig. 5, and is urged downwardly with respect to the cutting dies 27 and 29 by ram 32 or other suitable means.

The final product, illustrated in Fig. 6, comprises a metal ring 33 of serpentine contour from which sprocket teeth 34 extend outwardly and mounting teeth 35 extending inwardly. Between each mounting tooth 35 is a serration 36 which extends radially of the ring 33. Each serration 36 registers radially with one of the teeth 34 of the wheel. The projections 22 and 23 of the dies 19 and 20 respectively form registering depressions 37 in the opposite side faces of the ring 33. The projections 22 and 23 are so constructed and arranged as to form the base ends of the depressions 37 as regular partial continuations of the serrations 36 and to locate the tapered ends of the depressions 37 in the central portions of the teeth 34. The depressions vary in arcuate cross section from a maximum radius of curvature at the inner extremity of the ring 33 to a minimum radius of curvature at a location centrally of the teeth 34. The lateral sides 38 of the depressions 37 conform generally with the inclinations of the side edges 39 of the teeth 34 and during the compressive formation of the depressions 37, the metal between the lateral sides 38 thereof and the side edges 39 of the teeth is crowded toward the latter in such a manner as to orient the flow lines 40 of the metal of this portion of the wheel into generally parallel or longitudinally extending conformity with the side edges 39 of the teeth. This flow line orientation is much more suited to withstand shock, load, wear and strain than is the radially extending flow line orientation which normally results from compression of a billet and subsequent compression of a blank formed therefrom into an annular member of this character. Termination of a large number of flow lines at the side edges of the teeth is avoided. Provision of depressions of this character reduces the weight of the finished product and also reduces the area of the surface of the side faces thereof which it is necessary to machine.

Although but one specific embodiment of the invention is herein shown and described, it will be apparent that various changes in the size, shape and arrangement of parts may be made without departing from the spirit of the invention.

What is claimed is:

1. A sprocket wheel comprising a forged metal ring having integral sprocket teeth extending from its outer edge, and registering compression formed depressions in respectively opposite side faces of said sprocket wheel each extending substantially from the inner edge of said ring and tapering in width and thickness outwardly of said sprocket wheel and terminating centrally of one of the teeth of said wheel, the flow lines of the metal between the lateral extremities of said depressions and the edges of said teeth being crowded as a result of compression formation of said depressions into generally conforming relation with respect to the contour of said edges.

2. A toothed wheel comprising a forged metal ring having integral teeth extending from its outer edge, and a plurality of compression formed depressions in at least one side face of said ring, each extending radially thereof into the central portions of one of said teeth and having lateral extremities spaced from and conforming generally with the contour of the side edges thereof, the flow lines of the metal between the lateral extremities of said depressions and the side edges of said teeth being crowded as a result of compression formation of said depressions into generally conforming relationship with respect to the contour of said side edges.

3. A sprocket wheel comprising a metal ring of substantial thickness having integral sprocket teeth extending from its outer edge and having serrations in its inner edge each registering with the central portion of one of said teeth and extending outwardly radially of said wheel, and registering depressions in respectively opposite side faces of said sprocket wheel each constituting a compression formed continuation of one of said serrations and tapering in width and thickness outwardly of said sprocket wheel and extending centrally into the body portion of one of said teeth, the flow lines of the metal constituting the edge portions of each of said teeth being crowded as a result of compression formation of said depressions into generally conforming relation with respect to the contour of said edges.

4. A toothed wheel comprising a forged metal ring having integral teeth extending from its outer edge, and a plurality of compression formed depressions in at least one side face of said ring, each extending radially thereof into the central portions of one of said teeth and having successive arcuate cross sectional contours of progressively decreasing radius of curvature from a maximum radius of curvature at a point remote from said teeth to a minimum radius of curvature at a location centrally of said teeth, said depressions having lateral extremities spaced from and conforming generally with the contour of the side edges of said teeth and the flow lines of the metal between said depressions and the side edges of said teeth extending in generally conforming relation with respect to the contour of said side edges.

5. The method of making a toothed wheel which comprises the steps of forming a heated steel billet between dies by a hammering operation to a blank having a thin central portion and a thickened periphery, removing said thin central portion from said blank by a cutting operation, heating said blank and thereafter hammering said blank between dies to conform to a desired integral ring and radial external tooth wheel structure and simultaneously forming registering substantially radially extending depressions having lateral sides generally conforming with the contour of said teeth in the respectively opposite side faces of said wheel from a location adjacent the inner extremity of said ring to a location centrally of each of said teeth in order to crowd the flow lines of the metal between the lateral sides of said depressions and the side edges of said teeth laterally in the plane of said ring into longitudinally extending conformity with said side edges.

6. The method of making a toothed wheel which comprises the steps of forming a heated steel billet between dies by a hammering operation to a blank having a thin central portion and a thickened periphery, removing said thin central portion from said blank by a cutting operation, heating said blank and thereafter hammering said blank between dies to conform to a desired integral ring and radial external tooth wheel structure and simultaneously forming in at least one side face of said ring radially extending depressions varying in arcuate contour from a maximum radius of curvature at a location adjacent the inner edge of said ring to a minimum radius of curvature at a location centrally of said teeth in order to orient the flow lines of the metal between said depressions and the side edges of said teeth laterally in the plane of said ring into longitudinally extending conformity with said side edges.

7. The method of making an integral rim and tooth structure which comprises heating a ring shaped blank, and hammering said blank between dies to conform to an integral ring and laterally extending tooth structure and simultaneously crowding the metal on respectively opposite sides of the central portions of the root end and adjacent parts of each tooth laterally outwardly in the plane of said ring toward the side edges of said teeth in order to bring the flow lines of such metal into longitudinally extending conformity with the side edges of said teeth.

KAUFMAN T. KELLER.